March 15, 1949. W. L. PEARSON 2,464,712
DISCONNECTIBLE BALL BEARING
Filed Aug. 26, 1946 2 Sheets-Sheet 1
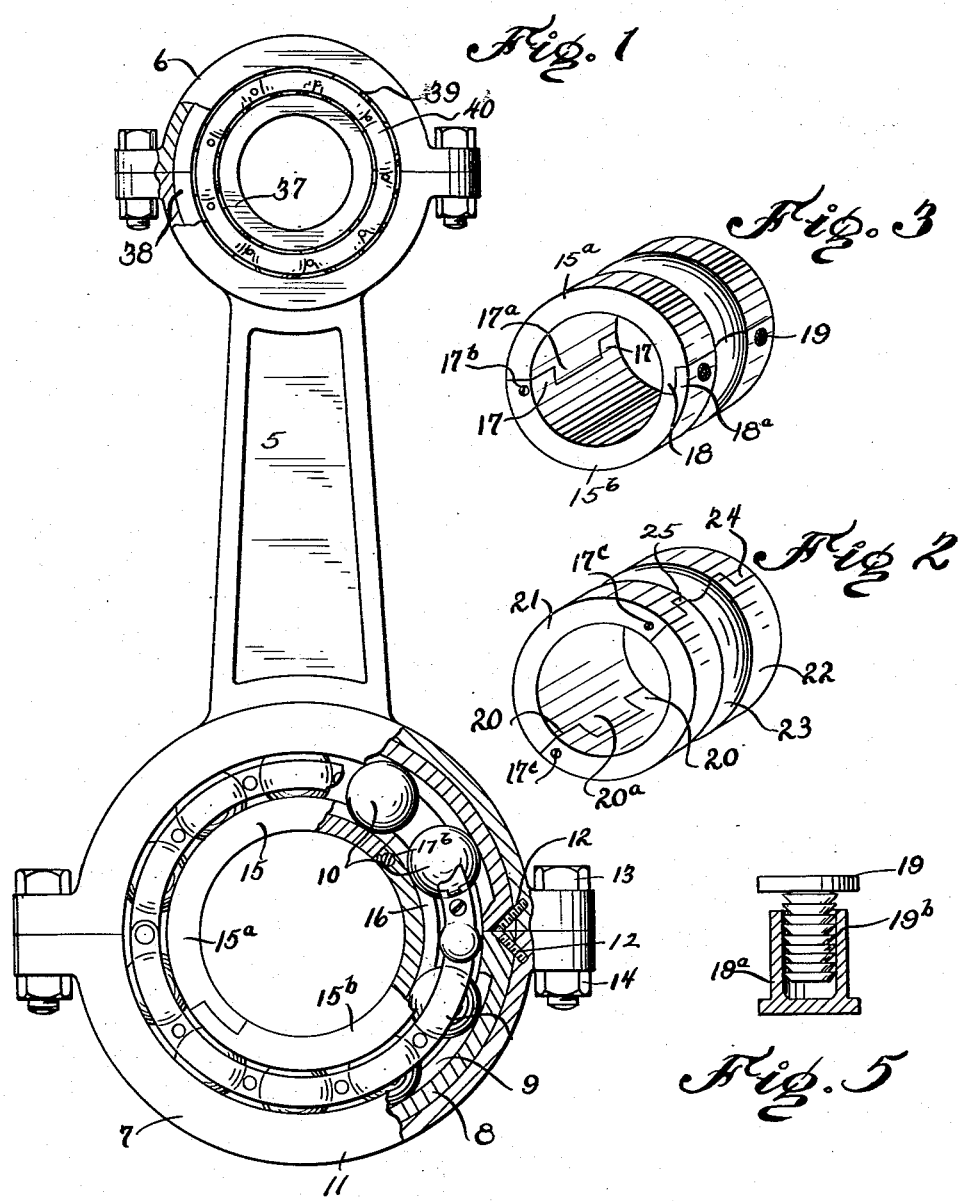
INVENTOR.
Walter L. Pearson
BY Shepherd Campbell
attys.

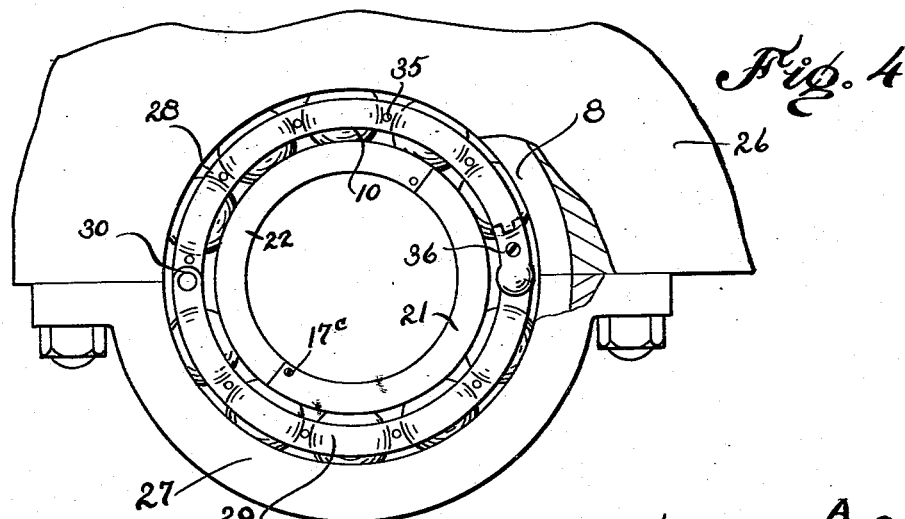
Fig. 4
Fig. 6  Fig. 7
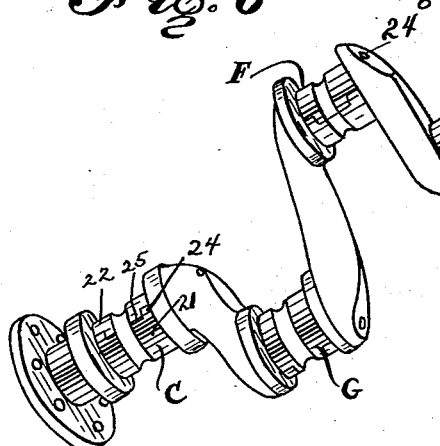
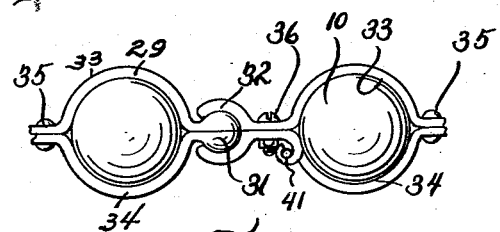
Fig. 8
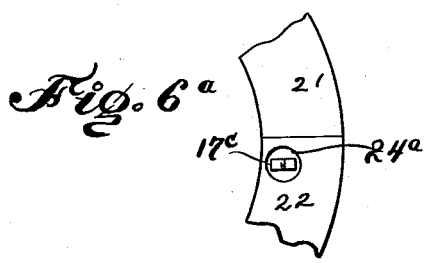
Fig. 6a
INVENTOR.
Walter L. Pearson
BY
Shepherd & Campbell
attys Patented Mar. 15, 1949

2,464,712

UNITED STATES PATENT OFFICE 2,464,712

DISCONNECTIBLE BALL BEARING

Walter Leonard Pearson, Mobile, Ala.

Application August 26, 1946, Serial No. 693,049

5 Claims. (Cl. 308—201)

The object of the present invention is to provide a very efficient ball bearing particularly adapted for use upon connecting rods and crank shafts of engines but capable of use in many other relations.

The invention will be best understood by reference to the accompanying drawings, wherein:

Figure 1 is a view partly in side elevation and partly in section of a connecting rod illustrating both the wrist pin and crank shaft ends;

Figure 2 is a perspective view of a ball race carrying sleeve or bearing element hereinafter described;

Figure 3 is a perspective view of a modified form of ball race carrying sleeve hereinafter described;

Figure 4 is an end view, with parts broken away and in section, illustrating the disconnectible bearing used as a main bearing;

Figure 5 is a sectional view of a locking brad hereinafter described;

Figure 6 is a detailed view of the locking screw used in conjunction with the structure of Figure 2;

Figure 6a illustrates a fragment of Figure 2, showing the same cutout to receive the split end of the screw of Figure 6;

Figure 7 is a perspective view of a crank shaft having the race-carrying bearing sleeves applied thereto; and Figure 8 is a detailed sectional view through the universal joint at the disconnectible end of the ball ring or cage, hereinafter described.

Like numerals designate corresponding parts in all of the figures of the drawing.

Referring to the drawing, 5 designates a piston connecting rod for engines, the wrist pin end of which is indicated at 6, and connecting rod end of which is indicated at 7. Any suitable material is to be employed in the construction of the several parts described.

An outer bearing rim or ring 8 at the crank shaft end comprises the two semicircular members shown having complementally formed in their inner face the race 9 for the steel balls 10. These semicircular halves are secured respectively to the connecting rod body 5 and to the connecting rod cap 11, by screws 12 and the connecting rod cap is secured to connecting rod 5 by the conventional bolts and nuts 13 and 14. An inner bearing ring or rim 15 has a race 16 for the balls complementally formed in its outer periphery and this rim is made up of the two halves 15a and 15b. In the form illustrated, in Figure 1, this inner bearing rim is of the type illustrated in Figure 3. That is to say, the two halves at one side have engagement with each other through the medium of ears 17, 17a, and a screw 17b which constitutes the pintle of the connection. At the opposite side these halves are provided with the lap joint portions 18, 18a and these lap joint portions are traversed by and pinned together by the lock joint brads comprising the parts 19, 19a, illustrated in Figure 5. The part 19a constitutes the female member of the brad and the part 19 constitutes the male member of the brad. The member 19 is provided with relatively sharp circumferential ribs 19b which are adapted to bite into the part 19a when the two parts are driven together, and these brads are inserted in the openings of the lap joint portions 18, 18a, in such manner as to traverse and tie together these portions and preferably to be countersunk when driven fully home. In lieu of a ball race rim or ring, like that shown in Figure 3, I may employ a structure such as that illustrated in Figure 2. Here interlocking ears 20, 20a and a screw 17c constitute a connection between the two halves 21 and 22. These halves have a ball race 23 complementally formed therein. At the side of this bearing ring opposite the ears, like interlocking ears 24 and 25 are adapted to be locked together by one of the screw pins 17c. At the end of the screw pins 17b, 17c, remote from the heads of said screws, said screws are slotted so that the slotted end may be readily spread and the material of the bearing rings is recessed as indicated at 24a at the point where these slotted ends emerge, to provide room within which the said split ends may be spread.

While I have illustrated the structures of Figures 2 and 3 having the ball 16–23 races formed upon the outer peripheries, I wish it to be understood that these structures may be used for either inner or outer bearing rims at will, and that when used as outer bearing rims the ball races will be formed upon the inner periphery of said bearing rims. In Figure 7 openings 24b are formed in the crank shaft through which the screws 17c may be put in place in securing the bearing rims upon the crank shaft. 24a (Fig. 6a) indicates a recess in the end of part 22 within which the split end of screw 17c is shown as having been spread apart like a cotter pin and this may be done by driving a punch or like tool through an opening such as 24b to so spread the split end of the screw.

In Figure 4, 26 designates a part of the engine frame and 27 a main bearing cap. The outer bearing ring 8 is like the corresponding bearing ring of Figure 1 and its upper and lower halves may be secured to the members 26 and 27 by screws 12 in the manner described with respect to Figure 1. In this case the steel balls 10 are shown as riding between the outer bearing ring or rim 8 and the inner bearing rim which is of the type illustrated in Figure 2 and the portions of which are correspondingly numbered.

The ball cage of the present invention is deemed to be of great importance. It comprises the two half rings 28 and 29. These two half rings each consisting of an inner and an outer side run are hingedly connected to each other by a pin 30. At a substantially diametrically opposite point one of the half rings is provided with a ball 31 and the other half ring is provided with a socket 32 adapted to be engaged over said ball. The half rings are made up as stated of the runs 33 and 34, lying upon the inner and outer sides of the balls 10 (see Figure 8) and at the points between said balls these runs are traversed by screws 35 or other suitable fastening devices by which the said runs may be drawn toward each other. The parts are so proportioned that the balls are not bound between these runs but are left free to rotate while at the same time the ball rings maintain the balls in properly spaced relation. The ball 31 and socket 32 at the ends of the two halves of the ball ring or cage constitute what is, in effect, a universal joint and when the screw 36 is tightened to draw the two halves of the socket 32 toward each other, as illustrated in Figure 8, the ball 31 will be drawn toward and into the socket 32 and obviously tighten the cage and tend to cause the balls to ride very snugly in the race 16. To facilitate engagement of socket 32 with ball 31 without completely separating the halves of the cage, a hinge may be provided at 41. This hinge permits sufficient movement of one half of socket 32 to effect disengagement of said socket from ball 31 (when disassembling the parts) without disturbing the assembled relation of the right hand ball 10 in Fig. 8 within the ring parts 33 and 34.

In Figure 7 I have illustrated how either the structure of Figure 2 or the structure of Figure 3 may be applied to the main bearing portions A, B, C or connecting rod engaging portions D, E, F, G, of said connecting rod.

At the piston end of the rod of Figure 1, a more or less conventional bearing comprising the inner bronze ring 37, an outer bronze ring 38, balls 39 and ball cage 40, is employed. When the ball race is formed upon the inner periphery of the bearing rims of Figures 2 or 3, instead of upon the outer periphery, the screws 17b and 17c instead of being located adjacent the inner edge of the bore of the rim will be located adjacent the outer edge thereof.

I prefer to employ bronze or similar metal when the bearing rims, herein described, are put on a crank shaft. Where used otherwise, steel rims may be employed, if desired. In every case steel balls are to be used. I prefer bronze for crank shafts and connecting rods because this metal tends to absorb the friction shock of the motor. However, the invention is not limited to the use of any particular metal in any place. Further, I wish it to be understood that the invention is not limited to use with crank shaft and connecting rod bearings but that it may be used in any machine assembly.

I am the first to provide a disconnectible ball bearing cage cut in two separable parts and employed with inside and outside rims to allow the ball bearing to be connected to or disconnected from a crank shaft or other element of such a nature that the bearing elements cannot be slipped over the end. My bearing provides longer life for motors and engines upon which they are used will consume much less fuel or will yield more speed for the same amount of fuel. Further, marked reduction in friction prevents burned out bearings. Manufacturers can use many of the tools now in use in the manufacture of these bearings and the cost of manufacture will be low. This bearing can be used in many places where the take down of regular bearings would be almost impossible.

I wish it to be understood that the invention is not limited to the precise construction set forth but that it includes within is purview whatever changes fairly come within either the terms or the spirit of the appended claims.

What I claim is:

1. A bearing rim for a ball bearing assembly comprising a cylindrical rim made up of two longitudinally separated parts, said parts being provided in each of their edges with ears which take into correspondingly notched portions of the other of said halves, longitudinally extending locking means extending through said ears for locking the two halves together, said locking means being in the form of an elongated screw having a split end and the material of the rim being recessed to provide a portion within which said split end may be spread while leaving said split end lying within the confines of the said rim, and a ball race complementally formed in said halves of said rim.

2. The combination with a crank shaft having its main bearing and wrist pin portions, of bearing rims mounted thereon, said rims being in longitudinally split halves which halves are united by screws extending throughout the length thereof and passing through interengaging ears formed respectively upon said halves, the metal of the crank shaft outside of said bearing rims being longitudinally bored to permit the insertion of, or the removal of, said screws.

3. In a disconnectible ball bearing, a ball cage made in two separable halves, circumferentially considered, each of said halves in turn being made up of inner and outer side runs complementally shaped to engage a row of balls, means for drawing said inner and outer sides toward each other, means for hingedly connecting said halves at one of their ends, the other end of one of said halves having its inner and outer side runs shaped to complementally form the ball of a ball and socket joint and the other end of the other of said halves having its inner and outer side runs complementally shaped to form the socket member of said ball and socket joint.

4. A structure as recited in claim 3 comprising means adjacent said socket member for forcibly drawing together the elements thereof.

5. A structure as recited in claim 3 wherein the socket member element at one side of the ball socket comprises a part that is hingedly connected to the remainder of the side run of which it is a part to thereby permit said part to swing upon a relatively short radius toward and from the ball of the ball and socket joint.

WALTER LEONARD PEARSON.

REFERENCES CITED

The following references are of record in the file of this patent:

UNITED STATES PATENTS

| Number | Name | Date |
|---|---|---|
| 1,340,310 | Wolff | May 18, 1920 |
| 1,966,775 | Weis | July 17, 1934 |